April 19, 1966 W. J. PORTER, JR., ET AL 3,247,260
RECOVERY OF PRODUCTS FROM ALDEHYDE SYNTHESIS BOTTOMS
Filed April 26, 1961
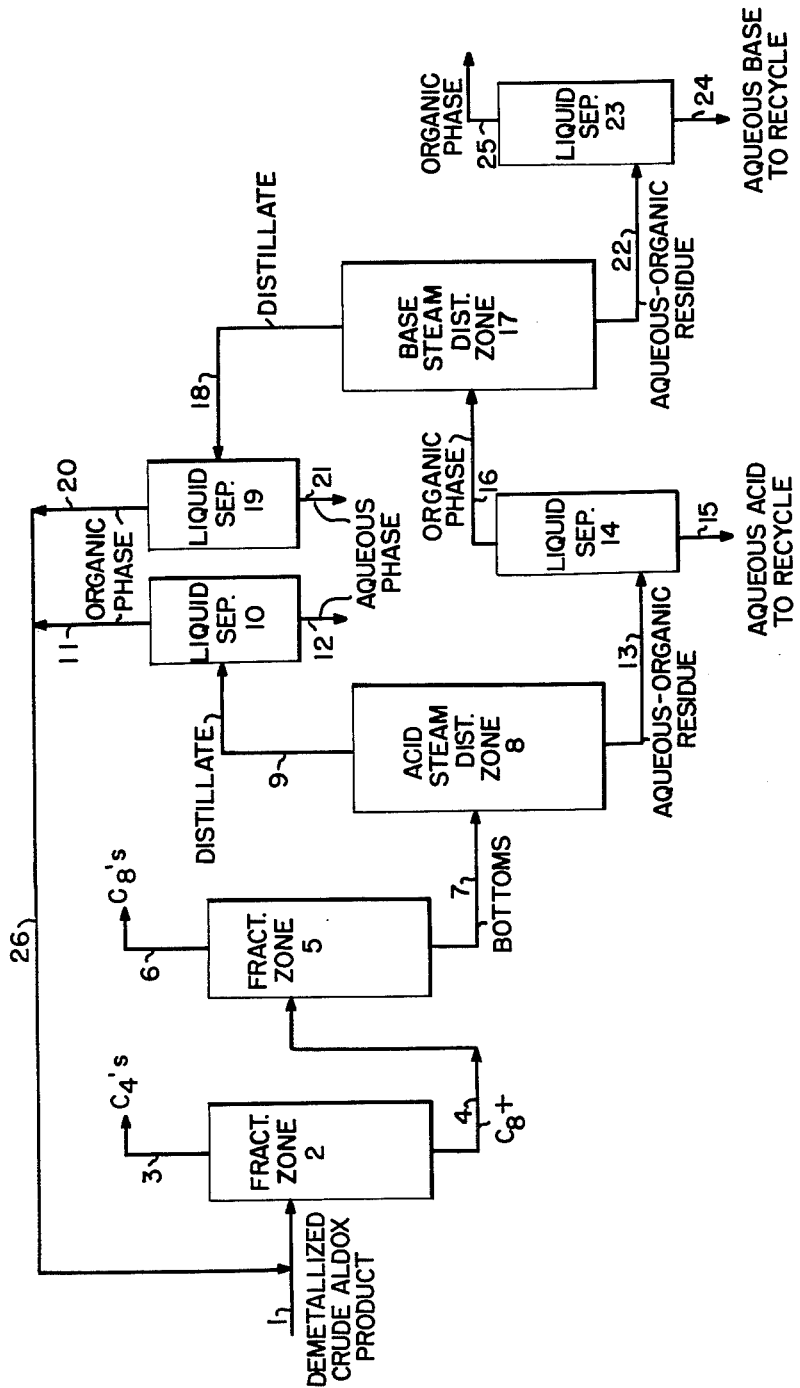
Walter J. Porter, Jr.
William T. House   Inventors
By *Jrmor A Slaby*   Patent Attorney _United States Patent Office_

3,247,260
Patented Apr. 19, 1966

3,247,260
RECOVERY OF PRODUCTS FROM ALDEHYDE SYNTHESIS BOTTOMS
Walter James Porter, Jr., and William Thomas House, Baton Rouge, La., assignors to Esso Research and Engineering Company, a corporation of Delaware
Filed Apr. 26, 1961, Ser. No. 105,711
3 Claims. (Cl. 260—612)

This invention relates to the aldox process in which dimer aldehydes having $2n+2$ carbon atoms are produced from olefins having $n$ carbon atoms. More particularly, the invention relates to a process for recovering useful products from the higher boiling bottoms fraction which remains after the dimer constituents are distilled off the crude aldox carbonylation-dimerization reaction product.

An increasingly important commercial process involves the conversion of lower olefins into aldehydes and alcohols having two more than twice as many carbon atoms as the original feed. Essentially, this modification of the well-established oxo process involves reaction of the olefins with carbon monoxide and hydrogen in the presence of a cobalt carbonylation catalyst at elevated temperature and pressure whereby the olefin is converted to oxygenated products including aldehydes having one carbon atom more than the olefin feed. The aldehydes resulting from this oxo synthesis are then dimerized by an aldol reaction in the presence of a dimerization catalyst to produce aldehydes having twice as many carbon atoms as the intermediate aldehyde. The dimerization reaction can be carried out concurrently with the carbonylation reaction by adding the dimerization catalyst to the oxo stage, or it may be accomplished by subjecting the carbonylation product or a portion thereof to the action of the dimerization catalyst in a separate stage. For convenience, both of these alternative oxo-aldol combination processes will be referred to herein as the "aldox" process or synthesis. In either case, the dimer aldehydes resulting therefrom can be hydrogenated to the corresponding alcohols.

While the aldox modification of the oxo process offers many advantages, including the ability to produce a greater variety of products in existing oxo facilities, nevertheless certain disadvantages are attendant therewith. For example, a relatively large proportion of the product from the aldox dimerization step comprises oxygenated materials boiling above the desired dimer products. These higher boiling products, generally called "bottoms," are obtained as a residue from the distillation of the crude demetallized aldox product. The bottoms fraction is only of secondary value and its formation has the adverse effect of substantially reducing the yield of valuable products from any given amounts of olefinic starting material. The economics of the aldox process would therefore be significantly improved by a practical method of recovering useful products from the bottoms fraction.

It has now been found that by subjecting the bottoms fraction from the aldox process to the hydrolytic action of aqueous acid while simultaneously distilling the fraction with steam, more than 25 wt. percent of the bottoms fraction can be recovered in the form of aldehydes and alcohols containing $n+1$ and $2n+2$ carbon atoms. Furthermore, by subjecting the organic residue from this acid-steam distillation to further hydrolytic action by aqueous base while simultaneously distilling the steam, an additional approximately 10 wt. percent of the bottoms fraction is recovered as aldehydes and alcohols containing $n+1$ and $2n+2$ carbon atoms. By combining the acid-steam and base-steam distillations of the present invention, a means is thereby provided for recovering as much as 35 wt. percent of the aldox bottoms fraction as useful products.

While the present invention is directed to the treatment of the bottoms fraction from the aldox process, and not to the aldox process per se, nevertheless it is believed desirable for the sake of completeness to generally describe the manner in which the bottoms fraction is produced.

An olefin feed, generally comprising olefinic hydrocarbons having $n$ carbon atoms, where $n$ is an integer greater than 2, preferably 2 to 20, is reacted with synthesis gas in the presence of a carbonylation catalyst to produce aldehydes having $n+1$ carbon atoms. The synthesis gas may contain ratios of hydrogen and carbon monoxide varying from 0.5–4/1, ratios of 1–2/1 being preferred. The optimum conditions for reacting the olefin with the synthesis gas vary somewhat depending on the nature of the olefin feed, but generally the reaction is conducted at pressures of about 1500 to 4500 p.s.i.g., preferably 2500 to 3500 p.s.i.g., and at temperatures in the range of from about 250° to 400° F., preferably at 320° to 360° F. About 2500 to 25,000 cubic feet of synthesis gas (measured at standard temperature and pressure), preferably 4000 to 6000 standard cubic feet, per barrel of liquid olefin feed are normally employed.

In the one-step aldox process, both a carbonylation catalyst, generally comprising cobalt, and a modifier or dimerization catalyst are added to the carbonylation reactor along with the olefin feed. Among the modifiers or dimerization catalysts, zinc comprising catalysts are preferred, although compounds of other metals such as magnesium, lead, beryllium, barium and the like may also be used. Catalysts soluble in the olefin feed, e.g., the $C_6$ to $C_{18}$ fatty acid salts of the metals such as the hexanoates, octanoates, decanoates, laurates, stearates and oleates, or similar organic acid salts such as the naphthenates and tallates, are particularly preferred. The amount of cobalt catalyst generally employed is 0.05 to 0.5 wt. percent, preferably 0.1 to 0.3 wt. percent, calculated as metal on olefin feed, while the dimerization catalyst such as zinc is added to the extent of 0.05 to 0.5 wt. percent, preferably 0.1 to 0.2 percent. Reference may be had to U.S. Patent 2,811,567 for further details regarding the one-step aldox process.

Alternatively, instead of converting the olefin to the dimer aldehyde in one step by the reaction just described, the present invention is similarly applicable to the product obtained by the two-step process wherein the crude aldehyde obtained in a conventional oxo synthesis is aldolized or dimerized in a separate stage in the presence of the dimerization catalyst, as hereinbefore described. The general operation of such a process is described in U.S. Patent 2,820,067 to which reference may be had for further details. The oxo step of the two-step process is carried out under substantially the same conditions as those described hereinbefore with reference to the one-step aldox synthesis except that, due to the absence of the aldolization catalyst in the conventional oxo step, even lesser amounts of cobalt catalyst may be used.

Both the one-step process and the two-step process produce a crude aldehyde mixture which contains as principal products the unsaturated and saturated dimer aldehydes, as well as varying amounts of monomer aldehydes, some dimeric aldol, the corresponding alcohols, heavy condensation products and the metal-containing catalyst residues. Before further processing, the catalyst residues generally are removed from this crude aldox mixture. Any of the various known demetallizing procedures may be used, e.g., scrubbing with aqueous acetic acid. After demetallizing, the crude mixture is subjected to fractional distillation wherein the desired alcohols and aldehydes and lower boiling products are removed from the higher boiling bottoms fraction.

In accordance with the present invention, the bottoms fraction is subjected to the hydrolytic action of acid with simultaneous steam distillation to remove the products of hydrolysis as they form. In a further embodiment of the invention, the organic residue from the acid-steam distillation is subjected to the hydrolytic action of base with simultaneous steam distillation to remove the base hydrolysis products as they form.

For a clearer understanding of the invention, the treatment of the bottoms fraction obtained from the aldox synthesis of $C_8$ aldehydes from propylene will be specifically described. The aldox synthesis is carried out under the following conditions:

Feed _____ Propylene.
Catalyst _____ {Cobalt oleate, 0.25% on propylene.
                    {Zinc decanoate, 0.15% on propylene.
$H_2/CO$ _____ 1.5 mole/mole.
Synthesis gas rate . 3,500 s.c.f./barrel of propylene (liquid).
Temperature _____ 325° F.
Pressure _____ 3,000 p.s.i.g.
Olefin feed rate ___ 0.5 volume per volume of reactor per hour.

As described in U.S. 2,811,567, the crude aldox mixture rich in $C_8$ aldehydes is withdrawn from the synthesis reactor, cooled to about 100° F., and unreacted gases are separated from the liquid aldox mixture. The gas-liquid separation is commonly effected in two or more stages, first at high pressure and then at or near atmospheric pressure. The degasified liquid product is then passed to a catalyst removal stage where it is treated with aqueous acetic acid (1% on aldehyde) at a temperature of about 180° F. to remove the cobalt and zinc catalyst from the crude aldox mixture, all in accordance with procedures now well known in the art. Hydrogen can also be added to the demetallizing stage. This has been found helpful in promoting decomposition of any cobalt carbonyl present.

The demetallized crude aldox mixture described above is next treated according to the present invention as illustrated in the attached drawing. Referring to the drawing, the demetallized aldox mixture is passed via line 1 into fractionation zone 2. Monomeric $C_4$ aldehydes and alcohols, along with any unreacted olefin, are removed overhead through line 3. Dimer $C_8$ products and heavier bottoms are withdrawn through line 4 and passed into fractionation zone 5 wherein $C_8$ constituents are removed overhead through line 6. The bottoms from fractionation zone 5 are passed through line 7 into an acid-steam distillation zone 8. Here the bottoms are contacted with aqueous acid and simultaneously subjected to steam distillation under the conditions set forth in Table I. Distillate is taken overhead through line 9 and passed into liquid separator 10. The organic phase, containing $C_4$ and $C_8$ oxygenated products liberated by the acid-steam distillation step, is recycled through lines 11, 26 and 1 to fractionation zone 2. The water phase, which is saturated with additional $C_4$ and $C_8$ products, is removed from separator 10 through line 12. The organic content of the water phase may be recovered by "salting out" techniques and recycled to fractionation zone 2, or the entire water phase may be recycled to the demetallizer (not shown) for removal therein of the organic constituents.

In a preferred embodiment of the present invention, the residues from the acid-steam distillation zone 8 are passed through line 13 to a liquid separator 14 wherein the organic and aqueous phases are separated. The aqueous acid-containing phase is removed through line 15 for recycle to acid-steam distillation zone 8 or discarded, if desired. The organic phase is passed from separator 14 through line 16 into base-steam distillation zone 17 wherein it is subjected to the simultaneous action of base and steam distillation under the conditions set forth in Table II. The distillate is removed overhead through line 18 and passed to liquid separator 19, from which an organic phase containing $C_4$ and $C_8$ oxygenated products is removed through lines 20, 26 and 1 for recycle to fractionation zone 2. The aqueous phase is removed through line 21 for "salting out" of organic constituents and recycle of the organic phase to fractionation zone 2 or for recycle to the demetallizer, as may be desired.

TABLE I

|  | Conditions | | |
| --- | --- | --- | --- |
|  | Broad | Preferred | Specific |
| Acid Hydrolysis Stage: | | | |
| Acid, wt. percent of aqueous phase | 20-60 | 25-35 | 30 |
| Aqueous phase, vol. percent of total feed | 5-75 | 40-60 | 50 |
| Temperature of liquid phase, °F | 190-240 | 210-230 | 220 |
| Steam, wt./hr./wt. of organic feed | 0.1-1 | 0.2-0.4 | 0.25 |
| Residence time, hr | 1-10 | 3-5 | 4 |

TABLE II

|  | Conditions | | |
| --- | --- | --- | --- |
|  | Broad | Preferred | Specific |
| Base Hydrolysis Stage: | | | |
| Base, wt. percent of aqueous phase | 5-75 | 40-60 | 50 |
| Aqueous phase, vol. percent of total feed | 5-75 | 40-60 | 50 |
| Temperature of liquid phase, °F | 190-240 | 210-230 | 220 |
| Steam, wt./hr./wt. of organic feed | 0.1-1 | 0.2-0.4 | 0.25 |
| Residence time, hr | 1-10 | 3-5 | 4 |

The residue from base-steam distillation zone 17 is removed through line 22 and passed into liquid separator 23 wherein the aqueous phase is separated from the organic phase and removed via line 24 for recycle to zone 17 or discard, as desired. The organic layer is removed through line 25 for subsequent use as fuel or otherwise.

The following examples will further serve to illustrate the advantages of the present process.

*Example 1*

A crude aldox product was obtained by reacting propylene with hydrogen and carbon monoxide in approximately 1.5/1 molar ratio at 3000 p.s.i.g. and a temperature of about 350° F. in the presence of 0.3 wt. percent cobalt in the form of cobalt tallate and 0.2 wt. percent zinc in the form of zinc decanoate. The crude product was demetallized by intimate contact with aqueous acetic acid. The demetallized crude product was then distilled to a cut point of 220° F. at 20 mm. Hg in a 20-plate column. A 400-ml. portion of the distillation residue, i.e., bottoms, was then mixed with 400 ml. of 30 wt. percent aqueous sulfuric acid and the mixture subjected to steam distillation. After 4 hours, 118 ml. of organic phase and 410 ml. of water phase had distilled over.

Analysis of the organic phase by gas chromatography gave the following composition:

| Compound: | Percent |
|---|---|
| Hydrocarbon | 0.64 |
| Isobutyraldehyde | 4.1 |
| n-Butyraldehyde | 6.4 |
| Unknown | 0.2 |
| Isobutanol | 10.0 |
| n-Butanol | 16.7 |
| 2-ethyl-4-methyl pentaldehyde | 5.1 |
| 2-ethyl hexaldehyde | 13.5 |
| 2-ethyl hexenal | 16.1 |
| 2-ethyl hexanol | 8.6 |
| Backflush | 18.7 |

*Example 2*

Additional experiments were run with 400 ml. portions of distillation bottoms, obtained as in Example 1, using steam distillation alone, steam distillation in the presence of an equal volume (400 ml.) of 30 wt. percent sulfuric acid, and steam distillation in the presence of the acid followed by steam distillation of the organic residue therefrom in the presence of an equal volume of 50 wt. percent sodium hydroxide. After 4 hours of steam distillation, the organic phase of the distillate in each instance was analyzed by gas chromatography to yield the following data:

| Constituent | Steam Alone | Steam+30% Acid | Steam+30% Acid Followed by Steam+50% Base |
|---|---|---|---|
| Hydrocarbons | 0.33 | 0.55 | 0.71 |
| $C_4$ Aldehydes | 0.65 | 6.50 | 6.99 |
| $C_4$ Alcohols | 1.29 | 8.70 | 10.76 |
| $C_8$ Aldehydes | 10.30 | 10.34 | 11.93 |
| $C_8$ Alcohols | 2.82 | 2.16 | 5.14 |
| Bottoms | 84.61 | 71.75 | 64.47 |

It can be seen from these data that simultaneous acid hydrolysis-steam distillation of the bottoms fraction provides a means of recovering nearly 28 wt. percent of the bottoms as useful $C_4$ and $C_8$ products, and that by a combination of the acid hydrolysis-steam distillation followed by base hydrolysis-steam distillation up to 35 wt. percent of the bottoms can be recovered as $C_4$ and $C_8$ products.

While the invention has been described with reference to the bottoms fraction derived from a specific olefin feed, the process is generally applicable to the bottoms recovered from the manufacture by the aldox process of aldehydes having the formula R.CHO wherein R is a straight or branched chain alkyl radical of $2n+1$ carbon atoms from olefins having $n$ carbon atoms per molecule, $n$ in each instance being greater than 2, preferably an integer ranging from 2 to 20. Suitable olefin feeds thus include ethylene, propylene, butene-1, butene-2, isobutylene, as well as any pentenes or higher olefin isomers or mixtures thereof which on oxonation produce an aldolizable aldehyde, i.e., an aldehyde having at least one hydrogen atom on the carbon adjacent to the carbon forming the carbonyl group.

Similarly, acids and bases other than those specifically recited in the foregoing illustrations of the process can be used. Thus, any acid which ionizes in aqueous solution to an extent sufficient to provide a ready source of hydrogen ion can be used in the acid-steam distillation step of the process. The so-called strong acids, which may be further characterized as having ionization constants at 25° C. greater than about $7 \times 10^{-4}$, however, are particularly suitable. Among the strong acids are both inorganic and organic acids such as sulfuric, nitric, phosphoric, hydrohalide, trichloroacetic, arylsulfonic, e.g., benzenesulfonic, and the like, acids. The strong inorganic acids of commerce such as sulfuric, nitric, phosphoric and hydrochloric acids are preferred, being relatively inexpensive and available in large quantities. Of these, sulfuric acid is especially preferred.

The bases suitable in the base-steam distillation step of the process, in turn, may be any of the known substances which provide readily available hydroxyl ion in the aqueous solution. The most useful bases are the strong inorganic bases, particularly the alkali metal hydroxides. Sodium hydroxide is especially preferred.

While the invention has been described with reference to specific embodiments, those skilled in the art will recognize that modifications can be made without departing from the spirit thereof. It is intended, therefore, that the foregoing description and examples serve merely to illustrate the invention, and that the scope thereof be limited solely by the appended claims.

What is claimed is:

1. In a process wherein an aldehyde having $n+1$ carbon atoms is produced by the addition of carbon monoxide and hydrogen to an olefin having $n$ carbon atoms at elevated temperatures and pressures in the presence of a cobalt-containing catalyst and said aldehyde is further contacted with a dimerization catalyst to obtain a crude reaction product containing aldehydes having $2n+2$ carbon atoms as well as bottoms comprising higher boiling oxygenated products, the improvement which comprises distilling said crude reaction product to separate the $2n+2$ products from said bottoms, adding to said bottoms a strong inorganic acid, steam distilling said acidified bottoms from 1 to 10 hours at a temperature in the range of 190° to 240° F. while maintaining the acid content of the aqueous phase in the range of 20 to 60 wt. percent and the water content of the aqueous phase in the range of 5 to 75 volume percent, recovering additional $n+1$ and $2n+2$ oxygenated products from the resultant steam distillate, recovering an organic residue from said steam distillation of said acidified bottoms, adding to said residue an alkali metal hydroxide, steam distilling the resulting basified mixture for from 1 to 10 hours at a temperature in the range of 190° F. to 240° F. while maintaining the alkali metal hydroxide content of the aqueous phase in the range of 5 to 75 volume wt. percent and the water content of the liquid phase in the range of 5 to 75 volume percent and recovering additional $n+1$ and $2n+2$ oxygenated products from the resultant steam distillate.

2. A process in accordance with claim 1 in which said alkali metal hydroxide is selected from the class consisting of sodium hydroxide and potassium hydroxide.

3. In a process for producing 2-ethylhexanol from propylene wherein said propylene is reacted with carbon monoxide and hydrogen in the presence of a cobalt-containing catalyst at elevated temperatures and pressures to produce a reaction product containing $C_4$ oxygenated product and said reaction product at least in part is contacted with an aldehyde dimerization catalyst at elevated temperatures and pressures to produce a $C_8$ oxygenated product and a bottoms fraction comprising higher boiling oxygenated products, the improved process whereby additional $C_4$ and $C_8$ oxygenated products are recovered which comprises separating said bottoms fraction from said $C_8$ and lower boiling components of said dimer product, adding sulfuric acid to said bottoms fraction, steam distilling the resultant mixture for 1 to 10 hours at a temperature in the range of 190° to 240° F. while maintaining the acid concentration of the aqueous phase between 25 and 35 wt. percent and the water content of the liquid phase in the range of 40 to 60 volume percent, recovering additional $C_4$ and $C_8$ oxygenated products from the resultant steam distillate, separating an organic phase from the aqueous phase of the residue from said acid steam distillation, adding sodium hydroxide to said organic phase, steam distilling the resultant basified mixture for 1 to 10 hours at a temperature in the range of 190° to 240° F. while maintaining the sodium hydroxide concentration of the aqueous phase between 40 and 60 wt. percent and the water content of the liquid phase in the range of 40 to 60 volume percent and recovering additional $C_4$ and $C_8$ oxygenated products from the resultant steam distillate.

References Cited by the Examiner

UNITED STATES PATENTS

| | | | |
|---|---|---|---|
| 2,683,752 | 7/1954 | Stanley et al. | 260—627 |
| 2,811,567 | 10/1957 | Mason | 260—638 |
| 2,820,067 | 1/1958 | Mertzweiller et al. | 260—638 |
| 2,894,990 | 7/1959 | Wennerberg et al. | |
| 3,013,082 | 12/1961 | Hagemeyer et al. | 260—601 |

LEON ZITVER, *Primary Examiner.*